Patented Sept. 19, 1922.

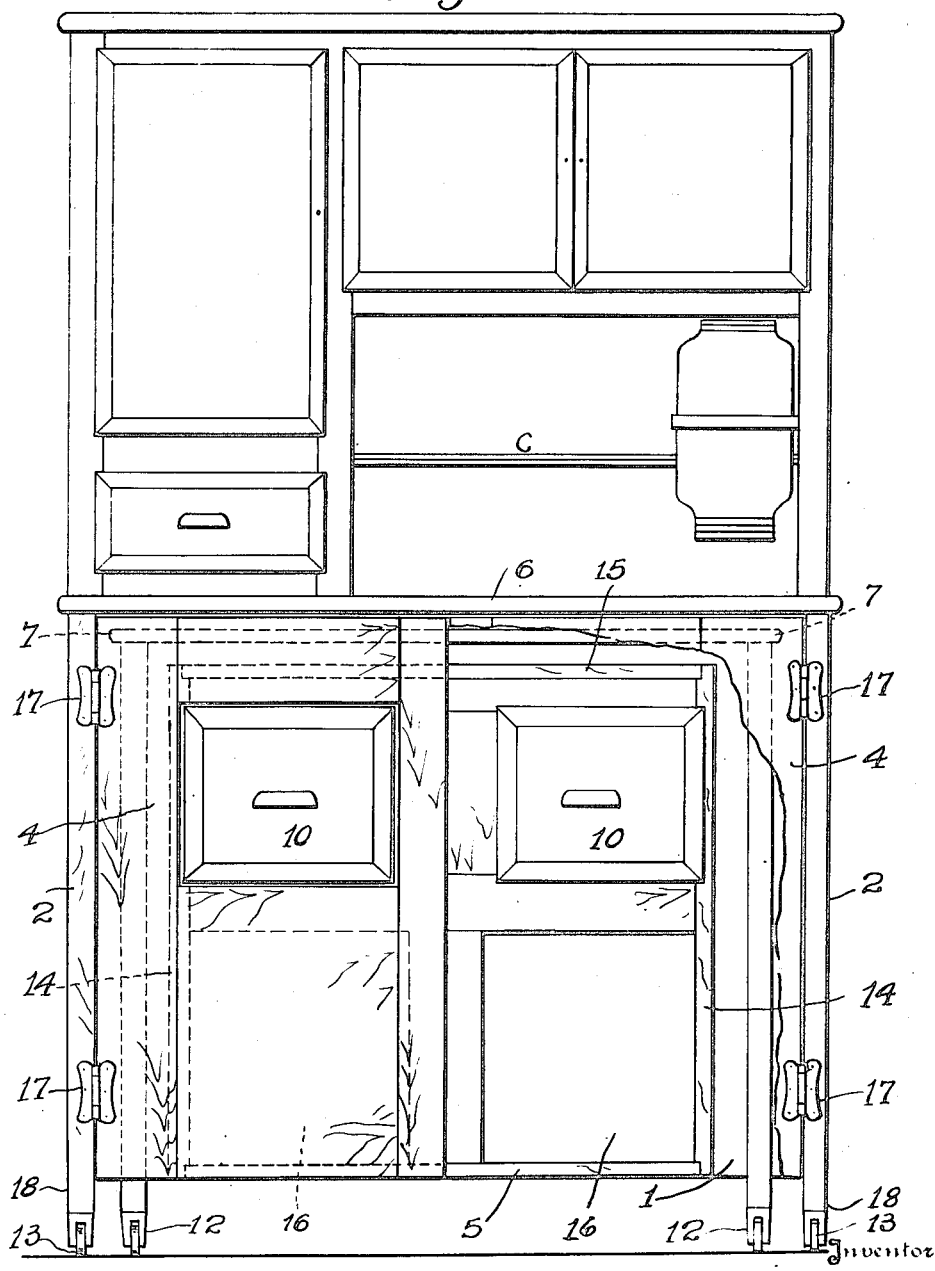

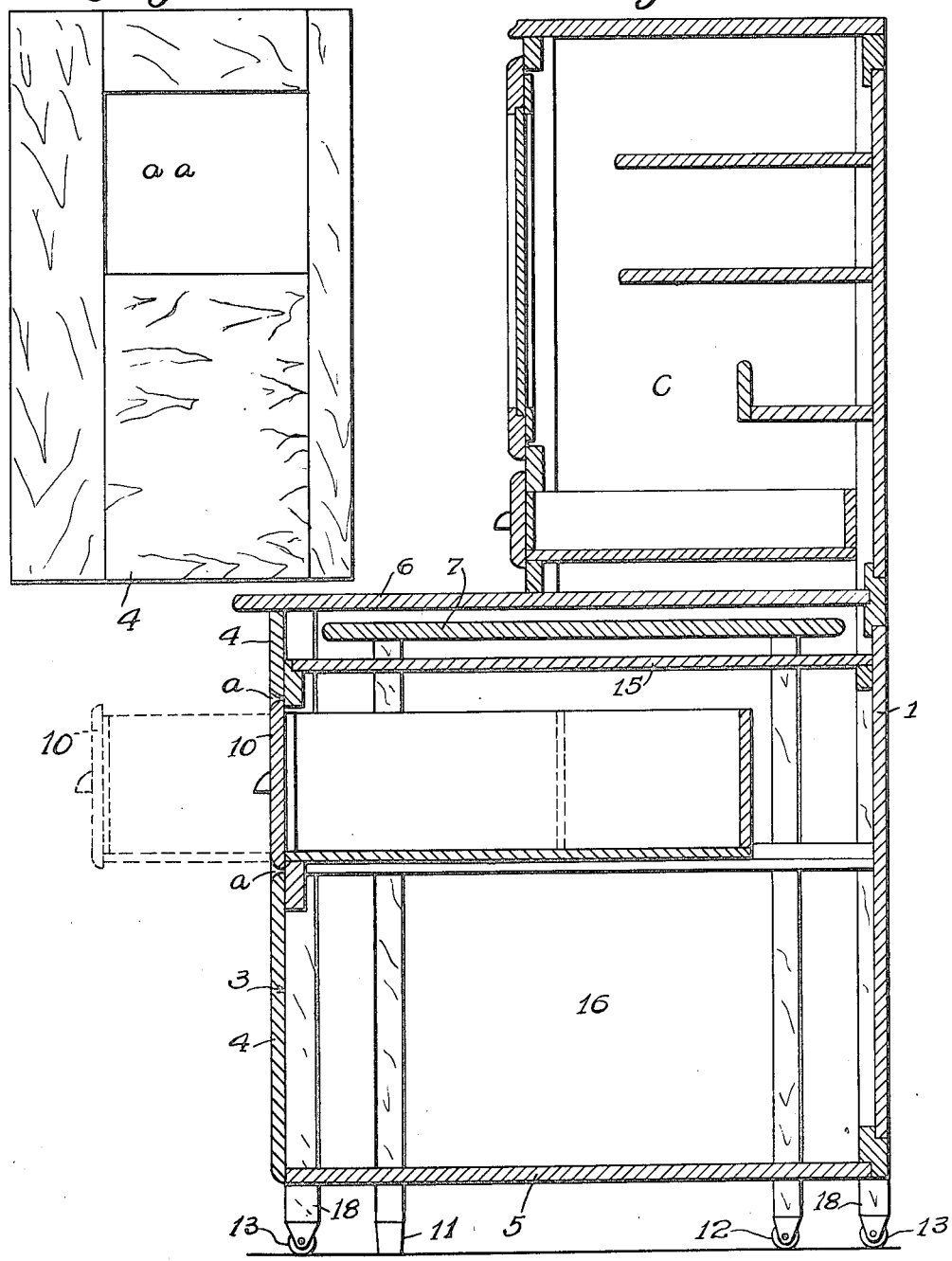

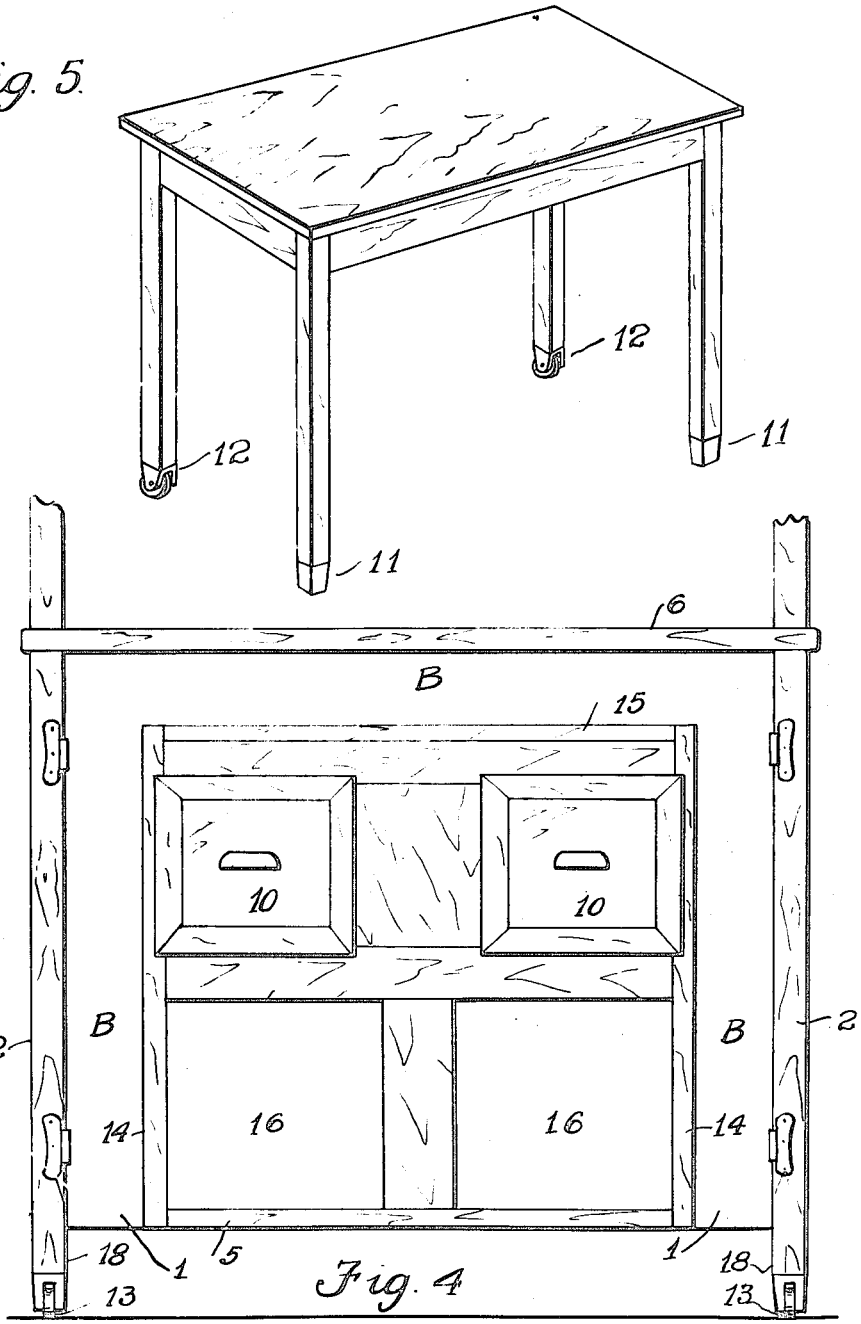

1,429,697

UNITED STATES PATENT OFFICE.

MAX M. SCHULTZ, OF DETROIT, MICHIGAN.

KITCHEN CABINET.

Application filed September 26, 1919. Serial No. 326,681.

*To all whom it may concern:*

Be it known that I, MAX M. SCHULTZ, a citizen of the United States, residing at Detroit, in the county of Wayne and State of Michigan, have invented new and useful Improvements in Kitchen Cabinets, of which the following is the specification.

This invention relates to kitchen cabinets, and the object of same is the production of a neat and seviceable combination kitchen cabinet with a built-in removable kitchen table, in which the latter is a separate part in itself, and can be removed from the kitchen cabinet when needed for work in preparing meals or to serve as a lunch table or for any other kind of kitchen use. When not in use, the table can be put away in the cabinet, which has a recess provided for it between the outside walls of the cabinet and the side walls of the cupboard base and the top of the cupboard base and the stationary table top of the kitchen cabinet. When the table is thus put away in the recess provided for it in the cabinet, said recess may be closed with doors which also close the lower cupboard base, thus concealing the table when not in use and also saving floor space which is the main object of this invention.

With these and other objects in view this invention consists of certain novel constructions, combinations and arrangements of parts as will be hereinafter fully described and claimed.

In the drawings:

Figure 1 is a front view of the kitchen cabinet, partly broken away;

Figure 2 is a transverse section;

Figure 3 is a view of the door showing the opening in its construction to allow drawer to slide through it;

Figure 4 is a front view of the lower portion of the cabinet base with drawers in the cupboard chamber, and the kitchen table removed from same, and Figure 5 is a perspective view of the kitchen table removed.

Referring to the drawings:

1 and 3 denote the rear and front walls of the cabinet, and 2, 2 are the side walls thereof, these walls inclosing the lower base or the chamber cupboard 16, 16 of the cabinet which is attached to the rear wall 1, and same may be held in any suitable manner. 14, 14 are the side walls of the inside cupboard chamber with two built-in drawers 10, 10, as shown in Figure 4. 16, 16 constitute lower cupboard for the use of kitchen utensils and 15, 15 form the bottom and top of the inside cupboard chamber 16, 16. Said cupboard chamber carries two drawers 10, 10, which slide through the openings in the front doors 4, 4, shown in Figure 3 and Figure 2 *a, a*, in the doors showing the openings in said doors for the drawers to slide through when said doors are in closed position on the cabinet. The doors 4, 4 are attached to the side walls 2, 2 on hinges 17, 17, 17, 17, the doors 4, 4 when closed covering the recess B in Figure 4, which is between the side walls 2, 2 of the cabinet, and the side walls 14, 14 of the lower cupboard chamber, and also the opening between the cabinet stationary table top 6 and the top 15 of the lower cupboard chamber 16, 16. Cabinet C has castors 13 attached to its four legs 18, 18, so that the whole cabinet can be moved around when so desired, the dotted lines of the drawer 10 in Figure 2 showing the drawer partly drawn out through the door 4, through the opening *a, a* in said door 4.

When in normal position in the cabinet, it can be plainly seen that the drawers 10, 10 do not interfere with the doors 4, 4 when said doors are closed or opened. The drawers can be pulled in or pulled out regardless of the doors. The kitchen table 7 in Figure 5 has two stationary legs without castors 11, 11, and the two legs 12, 12 with castors attached to the bottom of same. This construction of kitchen table is very advantageous in this combination as a kitchen cabinet with built-in removable kitchen table, by having two legs of the table on castors and the other two legs without castors, making this table feasible for the very purpose it was invented for and intended for, as for instance to remove the table from the cabinet, it requires a slight tilt and same can be pulled out without noise or drag. Changes may be made in general organization and particular construction of some of the component elements of my improved device without departing from the spirit of the invention, especially in the construction and operation of the recess for receiving the kitchen table and also the doors through which the drawers slide without interfering with the cupboard.

I claim:—

1. A kitchen cabinet comprising a housing having a bench top, a table proportioned to be inserted beneath the top, closures for retaining the table in position, provided with openings, and drawers located within the lines of the table adapted to be withdrawn through the openings.

2. A kitchen cabinet comprising a housing having a bench top, a cabinet beneath the bench top, providing a space entirely thereabout, a table proportioned to be inserted within the space under the bench top, and closures for the opening retaining the table in position.

3. A kitchen cabinet comprising a housing having a bench top, a cabinet located within the housing and providing a space entirely thereabout, a table proportioned to be inserted and retained within the space embracing the cabinet, closures for the space retaining the table in position, and drawers forming a part of said cabinet, withdrawable through the openings in the doors.

4. A kitchen cabinet comprising a housing, doors closing the housing and provided with openings, a cabinet located within the housing and embodying drawers and face members carried by the drawers substantially filling the openings in the doors, permitting the withdrawal of the drawers.

5. A kitchen cabinet comprising a housing having a cabinet located therein, providing a space entirely thereabout, drawers located within the cabinet and having face members extending beyond the cabinet, a table proportioned to be inserted and retained within the cabinet, and doors adapted to close over the front of the cabinet and retain the table in position, said doors being provided with openings proportioned to accommodate the face members of the drawers.

MAX M. SCHULTZ.

Witnesses:
ROMAN SCHULTZ,
STELLA M. SCHULTZ.